United States Patent Office 3,215,668
Patented Nov. 2, 1965

3,215,668
MIXED CARBONATE-CARBAMATE POLYESTERS
AND PROCESS OF MAKING
William E. Bissinger, Akron, Franklin Strain, Barberton, and Henry C. Stevens and William R. Dial, Akron, Ohio, and Raymond S. Chisholm, Pittsburgh, Pa., assignors to Pittsburgh Plate Glass Company, Pittsburgh, Pa., a corporation of Pennsylvania
No Drawing. Continuation of applications Ser. No. 698,055, Nov. 22, 1957, and Ser. No. 113,628, May 31, 1961. This application Apr. 9, 1962, Ser. No. 185,796
23 Claims. (Cl. 260—47)

This application is a continuation of application Serial No. 698,055, filed November 22, 1957, and application Serial No. 113,628, filed May 31, 1961.

This invention relates to novel types of synthetic resins and to the preparation of these materials. According to this invention, synthetic resins of unusual toughness and high molecular weight have been obtained. A large portion of the resins herein contemplated are thermosetting in addition to having the high toughness and molecular weight characterizing all of these resins. Such thermosetting resins have little or no solubility in organic solvents and resist melting or remain substantially unmelted when heated to temperatures above 100° C., for example, 110° C. to 200° C. Other resins contemplated herein are thermoplastic and can be formed under heat and/or pressure. Such resins also are characterized by their toughness, good electrical properties, and other advantageous properties.

According to this invention, novel resinous polycarbonate esters of an alkylidene bis phenol which contain carbamate or amide groups have been produced. Some of these resins contain the general structure:

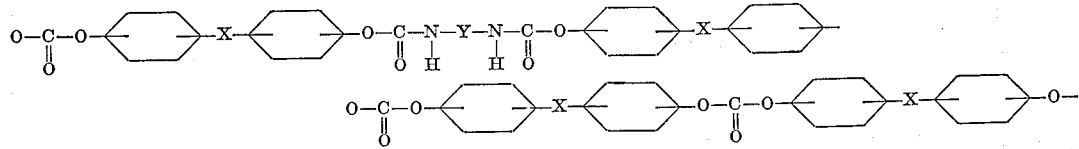

where X is the link or linking radical between a pair of phenyl radicals, Y is the link or linking radical between the nitrogens, such as the radical of a diamine. Thus, it will be seen that the polymer is a mixed polymer ester of (A) bis-phenol and (B) carbonic acid, and the theoretical bis-carbamic acid having the structure:

$$\text{HO}-\overset{\text{H}}{\underset{\overset{\|}{\text{O}}}{\text{C}}}-\text{N}-\text{Y}-\overset{\text{H}}{\text{N}}-\overset{}{\underset{\overset{\|}{\text{O}}}{\text{C}}}-\text{OH}$$

Y being the linking radical between the carbamic acid groups.

The ratio of the carbamate groups

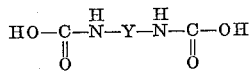

to the carbonic groups

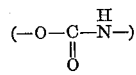

should be such that the carbonic groups are substantially in excess. Normally, the number of carbonic groups are at least about twice the number of carbamate groups and may be as high as 20 or even 50 times the number of carbamate groups.

The carbamate-carbonate esters of the alkylidene bis phenol may be prepared in various ways. For example, a bis chloroformate of a bis-phenol may be reacted with a diamine and a dihydroxy compound which contains two hydroxy groups capable of reacting with chloroformate to form carbonate esters. In this case, about 2 to 20 or even as high as 50 equivalents of the dihydroxy compound are used per equivalent of diamine.

The type of resin obtained depends upon the manner by which the reaction is conducted. Since the amine normally is more reactive than the hydroxy compound (bisphenol or glycol), the amine normally reacts to a greater degree than the hydroxy compound when the bis-phenol chloroformate is added to a mixture of the two. In such a case, the resin obtained is in essence two resinous esters (block polymers) linked together, the one being a polymeric ester of the bis phenol and the theoretical carbamic acid mentioned above, the other being the polycarbonate of the bis-phenol and the hydroxy compound. Such a resin consists essentially of blocks or chains of the two types of polymeric esters. A similar type of material is obtained when the diamine is mixed first with the polychloroformate of the bis phenol, and the dihydroxy compound added later.

A more regular alternation of carbonate and carbamate groups in the chain can be achieved by separately adding the diamine and the bis-chloroformate compound to a pool of the dihydroxy compound containing the hydrogen chloride acceptor, each being added at a relatively slow and controlled rate. Thus, the amine and the bis-chloroformate may be added to a pool of the chloroformate at relative rates proportional to the total moles of chloroformate, hydroxy compound, and amine to be used. For example, if one mole of diamine and one mole of dihydroxy compound are to be reacted with 2.2 moles of the bis-phenol bis-chloroformate, a pool of the dihydroxy compound and an excess of hydrogen halide acceptor, for example, 5.5 moles of aqueous sodium hydroxide, sodium carbonate or bicarbonate, is established. Thereafter, the one mole of diamine and 2.2 moles of bis-chloroformate are added gradually and simultaneously at a rate such that, during any period during the addition, 2.2 moles of bis-chloroformate are being added per mole of diamine.

If desired, the proportionate rate of addition of the bis-chloroformate may be faster than the rate of adding the amine, i.e. the proportionate rate per minute of addition of chloroformate and amine on a mole basis is not substantially less than the molecular proportion of the total chloroformate to total amine to be added.

The following are typical examples:

*Example 1*

The bis-chloroformate of bis-phenol A (a condensation product of acetone and phenol, otherwise known as p,p′-isopropylidene-diphenol, see Merck Index, 6th edition) is prepared as follows:

Two hundred grams of phosgene is dissolved in 2000 cubic centimeters of toluene at 5° C. Then, 228 grams of bis-phenol A in 1000 cubic centimeters of dioxane is added, followed by the addition of a solution of 242 grams of dimethyl aniline in 240 cubic centimeters of dioxane. During the addition of the dimethyl aniline solution, the temperature rises to 47° C. Then heat is finally applied to raise the temperature to 85° C. for three hours. The mixture is allowed to stand overnight.

Two liquid phases are thus produced. The lower dimethyl aniline hydrochloride phase solidifies and is filtered off. The filtrate is topped at reduced pressure at 50° C., first at 85 millimeters and then at 1 millimeter absolute pressure, until no more solvent is collected. The solid bis-chloroformate of bis-phenol A is thus produced. This material is purified by recrystallization from ethylene chloride.

A sodium phenate solution is prepared by mixing one mole of bis-phenol A with 500 grams of sodium hydroxide as an aqueous solution of sodium hydroxide containing 10 percent by weight of NaOH and 600 milliliters of methylene chloride at a temperature of 25° C. to 30° C. One mole of p,p'diaminodiphenylmethane and 600 milliliters of methylene chloride is added to this solution.

Thereupon, 3.5 moles of bis-phenol A bis-chloroformate in 1500 milliliters of methylene chloride is added to the mixture while maintaining the temperature at about 25° C. to 30° C. The resultant viscous, white reaction mixture is stirred for an additional hour after addition of the chloroformate has been completed, and the mixture is allowed to stand for 14 hours. The reaction mixture is diluted with 5000 milliliters of methylene chloride and washed thoroughly with six 5000-milliliter portions of water in a separating funnel. The mixture is then washed with an aqueous solution which contains 3 percent by weight of pyridine and 2 percent by weight of NaOH. Thereafter, it is washed to neutrality with a dilute aqueous hydrochloric acid solution and thereafter washed with water. The solvent is evaporated and a viscous, resinous, solid polymer is obtained.

*Example II*

The process of Example I is performed using the same materials except that the procedure of adding the reactants is different. In this example, separate streams of the bis-phenol A chloroformate and the p,p'-diaminodiphenylmethane are added gradually to the methylene chloride solution containing the sodium phenate of the bis-phenol (the reaction product of the bis phenol and the sodium hydroxide). The rates of addition of the chloroformate solution and the amine solution are so proportioned that the entire amounts of each material are added during the same period of time. That is, the number of millimoles of chloroformate introduced into the solution per minute is approximately 3.5 times the number of millimoles of amine introduced per minute therein.

*Example III*

The process of Example II is performed using one mole of hexamethylene diamine in lieu of p,p'-diaminodiphenylmethane.

*Example IV*

The process of Example II is followed except that 1.8 moles of bis-phenol A and 0.2 mole of the p,p'-diaminodiphenylmethane is used in lieu of the amount set forth in Example I.

The above processes produce tough resins which can be molded at temperatures in the range of 150° C. to 200° C. under pressure.

When 0.1 to 1 mole (for example, 0.5 mole) of 4,4'-diisocyanate - 3,3' - dimethyl biphenyl (commercially known as "TODI") or like diisocyanate is intimately mixed with any of these resins and the mixture molded at 200° C. and held at 200° C. for 30 minutes, clear, tough, insoluble, essentially infusible polymers are produced.

The above are typical examples of the manner in which the resins herein contemplated may be prepared. Various alkylidene bis phenols can be used in equivalent amount in lieu of bis-phenol A in the above examples. These include:

(4,4'-dihydroxy-diphenyl)-methane
1,1-(4,4'-dihydroxy-diphenyl)-cyclohexane
2,2'-methylene bis(4-methyl-6-tertiary butyl phenol)
2,2'-methylene bis(4-ethyl-6-tertiary butyl phenol)
4,4'-butylidene bis(3-methyl-6-tertiary butyl phenol)
4,4'-thiobis(3-methyl-6-tertiary butyl phenol)
1,1-(4,4'-dihydroxy-3,3'-dimethyl-diphenyl)-cyclohexane
2,2-(2,2'-dihydroxy-4,4'-di-tert-butyl-diphenyl)-propane
3,4-(4,4'-dihydroxy-diphenyl)-hexane
1,1-(4,4'-dihydroxy-diphenyl)-1-phenyl-ethane
2,2-(4,4'-dihydroxy-diphenyl)-butane
2,2'-(4,4'-dihydroxy-diphenyl)-pentane
3,3'-(4,4'-dihydroxy-diphenyl)-pentane
2,2'-(4,4'-dihydroxy-diphenyl)-3-methyl-butane
2,2'-(4,4'-dihydroxy-diphenyl)-hexane
2,2'-(4,4'-dihydroxy-diphenyl)-4-methyl-pentane
2,2'-(4,4'-dihydroxy-diphenyl)-heptane
4,4-(4,4'-dihydroxy-diphenyl)-heptane
2,2-(4,4'-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane Moreover, the corresponding bis-chloroformates of these bis-phenols may be used in equivalent amount in lieu of bis-phenol A bis chloroformate.

In addition, various other diamines can be used in lieu of the amines of the above examples, also in equivalent amount. Of particular interest are the amines which contain the group

where X is a radiacal, such as: —O—, —S—, the group

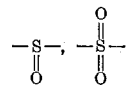

or a hydrocarbon radical or substituted divalent hydrocarbon radical which rarely contains more than 8 carbon atoms linking the two aniline groups

together. Some of these materials are prepared, as is understood by the art, by condensing aniline with an aldehyde, such as formaldehyde, acrolein, butyraldehyde, and like aldehydes containing up to about 8 carbon atoms, or a ketone such as acetone, methyl ethyl ketone, or like ketones containing up to about 8 carbon atoms. Some of these compounds are in monomeric form, others are in more complex polymeric form but contain two or more imino or amino groups.

Other diamines which can be used in lieu of amines used in Examples I to IV include the aliphatic diamines, such as ethylene diamine, hexamethylene diamine, propylene diamine, trimethylene diamine, tetramethylene diamine, 4,4'- diamino-dicyclohexyl methane, bis(ω-amino alkyl) sulphides, 2,4-diamino tetrahydrofurane, 1,4-diamino cyclohexane, as well as the aromatic diamines, such as o-phenylene diamine, 4,4'-diamino diphenyl ether, 4,4'-diamino benzophenone, 1,7-naphthylene diamine, piperazine, m-phenylene diamine, o-tolidine, m-tolidine, and the like.

Various dihydroxy compounds can be used in lieu of a portion of the bis-phenol A listed above. These include the various bis-phenols mentioned above as well as the various other dihydric alcohols or hydroxy compounds containing esterifiable hydroxy groups, such as ethylene glycol, diethylene glycol, triethylene glycol, tetraethylene glycol, propylene glycol, 1,3-propane diol, 1,4-butane diol, phthallyl alcohol, 1-butene-3,4-diol, 1,4-butene diol, resorcinol, catechol, thiodiglycol, and the like.

According to a further method of producing a resin of the type contemplated above, an alkylidene bis phenol, such as bis-phenol A, may be reacted in part with phosgene in the presence of a hydrogen chloride acceptor, such as an alkali metal or alkaline earth metal hydroxide, carbonate or bicarbonate, or an amine, and usually in the presence of halogenated hydrocarbon solvent, such as methylene dichloride. This results in the production of a polycarbonate of relatively low molecular weight having free chloroformate groups. Thereafter, a diamine, such as one of the diamines listed above, with or without more bis-phenol, may be added and the mixture allowed to stand or is heated until further reaction has taken place. The amount of diamine thus added can be up to one mole (usually not over 0.5 mole) of the diamine per mole of chloroformate

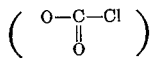

in the product.

The following is a typical example of the process herein contemplated:

Example V

Two thousand, one hundred milliliters of deionized water, 5.28 moles of sodium hydroxide, and 1.805 moles of bis-phenol A are placed in a flask. To this mixture is added 1350 milliliters of methylene chloride. The mixture is held at a temperature of 25° C. and 2.2 moles of phosgene is introduced at a constant rate over a period of about 3.25 hours while maintaining the temperature at about 25° C. The chloroformate chlorine content of the resulting resin is about 2.5 percent and the product thus corresponds to an average molecular weight of approximately 2900. To a portion of the solution containing 100 grams of the resulting resin is added 0.02 mole of ethylene diamine.

The resulting reaction mixture is then allowed to stand at 25° C. with stirring for a period of about 5 hours, and is heated at reflux temperature for 3 hours. Thereafter, the organic phase is recovered, washed with water to remove entrained salts, and the resulting solution is heated to evaporate the solvent. The resulting product is a powder which can be molded at 200° C. and at a pressure of 2000 pounds per square inch to produce a tough polymer. Films cast from a methylene chloride solution of the polymer are colorless, clear, and strong.

It is to be understood that the process set forth in Example V can be performed using various other amines in equivalent amounts in lieu of ethylene diamine. The amines and dihydroxy compounds which may be used are those listed above.

According to a further method, a mixture of the bis-phenol, such as bis-phenol A, with a diamine, such as methylene bis-aniline or hexamethylene diamine, may be reacted with a bis-chloroformate of another dihydric compound. Typical bis-chloroformates suitable for this purpose include the bis-chloroformates of the alkylene glycols, such as ethylene glycol bis-chloroformate, diethylene glycol bis-chloroformate, triethylene glycol bis-chloroformate, tetraethylene glycol bis-chloroformate, 1,4-butane diol bis-chloroformate, resorcinol bis-chloroformate, phthallyl alcohol bis-chloroformate or the like. The reaction is usually conducted in the presence of an acid acceptor, such as an alkali metal hydroxide or carbonate.

Here, again, the type of resin produced depends upon the order of addition of the reactants, a block type of polymer of the type discussed above being obtained when the amine is first reacted with the chloroformate as in Example I, and a more regular alternation of carbamate and carbonate groups being obtained when the bis-chloroformate and the amine are added to the pool of the sodium phenate as in Example II.

The following are typical examples:

Example VI

A mixture of 1 mole of bis-phenol A, 1 mole of methylene bis-aniline hydrochloride, 2.2 moles of diethylene glycol bis-chloroformate, and 3000 grams of methylene dichloride is placed in a flask and 7.5 moles of sodium hydroxide as an aqueous solution containing 50 percent by weight of NaOH is added while holding the mixture at 5° C. The product is allowed to stand at 25° C. for 4 hours and is recovered by washing with water and evaporating the solvent. The resulting product is a resinous material which, on molding at 175° C. under a pressure of 2000 pounds per square inch, forms a tough molding. When heated with 5 percent by weight of toluene-2,4-diisocyanate under pressure of 1000 pounds per square inch at a temperature of 200° C., an infusible polymer is obtained.

Example VII

The process of Example VI is performed using 1 mole of hexamethylene diamine in lieu of methylene bis-aniline.

Example VIII

One mole of bis-phenol A is mixed with 5.5 moles of an aqueous solution of sodium hydroxide (containing 10 percent by weight of NaOH) and 600 milliliters of methylene chloride. The mixture is held at a temperature of 25° C. to 30° C. while 2.2 moles of diethylene glycol bis-chloroformate and 1 mole of p,p'-diaminodiphenylmethane dissolved in 600 milliliters of methylene chloride are separately added thereto simultaneously over the same period of time. The mixture is recovered as in Example I.

A tough resin is obtained which cures to an infusible state when mixed with 1,5-naphthalene diisocyanate, the mixture molded and heated at 200° C. for 3 hours at a pressure of 2000 pounds per square inch.

Any of the other amines listed above may be used in equivalent amount in lieu of those mentioned in Examples VI and VIII. Bis-phenol A may be replaced in equivalent amount by other bis-phenols listed above and other bis-chloroformates, such as ethylene bis-chloroformate, 1,4-butane diol bis-chloroformate, etc., including those listed above, may replace equivalent amounts of diethylene glycol bis-chloroformate in the Examples VI to VIII.

As shown above, the various carbonate polymers which contain carbamate groups such as described above are fusible and soluble in organic solvents. This is an advantageous property during the period during which the resin is under preparation and/or processing for use.

These polymers can be converted to a state where they are essentially insoluble in inorganic solvents and where they are essentially infusible, or at least do not readily fuse at temperatures below their decomposition temperature, by mixing the polymer described above with an organic diisocyanate. Typical diisocyanates which may be used for this purpose include 1,5-naphthalene diisocyanate, tolylene diisocyanate, ethylene diisocyanate, trimethylene diisocyanate, tetramethylene diisocyanate, hexamethylene diisocyanate, decamethylene diisocyanate, heptylidene diisocyanate, and the corresponding diisothiocyanates; cycloalkylene diisocyanates and diisothiocyanates, e.g. cyclopentylene diisocyanate, cyclohexylene diisocyanate; aromatic diisocyanates and diisothiocyanates, e.g. m-phenylene diisocyanate, naphthalene diisocyanate, and diphenyl-4,4'-diisocyanate; aliphatic-aromatic diisocyanates and diisothiocyanates, e.g. xylene-1,4-diisocyanate, 4,4'-diphenylene-methane diisocyanate, and cyclopentyl diisocyanate; and diisocyanates and diisothiocyanates containing heteroatoms.

The preferred diisocyanates and diisothiocyanates are of the type OCN—R—NCO and SCN—R—NCS, wherein R represents saturated divalent hydrocarbon radicals with a chain length of at least two (rarely more than 12) carbon atoms.

The amount of the isocyanate so added normally ranges between about 0.1 to 1 mole of isocyanate groups per mole of reactive hydrogen such as present in carbamate and hydroxyl groups of the polycarbonate polymer subjected to treatment. The isocyanate may be incorporated by grinding or otherwise pulverizing the polymer and incorporating the isocyanate. Alternatively, the isocyanate may be added to the organic solution prior to evaporation of the solution. In such a case, however, the evaporation of the solvent should be conducted at a relatively low temperature, for example, 50° C. or lower.

At all events, the desired cured polymer is prepared by heating the polycarbonate-carbamate mixture with the diisocyanate at an elevated temperature, usually above 75° C. and rarely above 300° C. The resulting products retain to a large degree the inherent toughness of the polycarbonate subjected to treatment and at the same time exhibit little tendency to fuse upon heating. They are either inert to organic solvents or are only swelled by such solvents.

The various resins which have been described above can be used for many purposes. For example, they may be used to provide laminated articles. Thus, the resins herein contemplated can be used to impregnate woven or felted fiber glass, linen or cotton cloth or the like, and the impregnated fabric may be built up into a laminate which may then be heated at the fusion temperature of the resin to bond the layers together. These laminates can be used as structural material for roofing, siding and other construction materials for buildings, boats, etc.

Where diisocyanate is included in the nitrogenous-containing polymers described above, the resulting laminate is quite rigid and shows little tendency to distort at temperatures of 125 to 150° C.

The various resins herein contemplated may be applied to metal as a coating which may be either in the form of solutions or in the form of a powder which is melted or fused onto the metal surface. Many of the products herein contemplated have unusually high dielectric strength at elevated temperatures and may be used for electrical purposes as electrical insulation materials. Thus, they can be molded to enclose and protect electrical conductors, connections, switches and the like. Since the products are clear and tough, they may be used for transparent windows. They may also be drawn into fibers for use in fabrics. Substantially, all of these materials form very tough, impermeable films.

Hence, they may be used to produce films suitable for use in wrapping food and other articles and for other purposes where films of polyethylene and regenerated cellulose are used.

Although the present invention has been described with reference to the specific details of certain embodiments, it is not intended that such details shall be regarded as limitations upon the scope of the invention except insofar as included in the accompanying claims.

What is claimed:

1. A mixed carbonate-carbamate polyester of (A) a bis-phenol, (B) carbonic acid, and (C) a diamine.
2. A thermoplastic substantially linear polycarbonate-polycarbamate of the general structure:

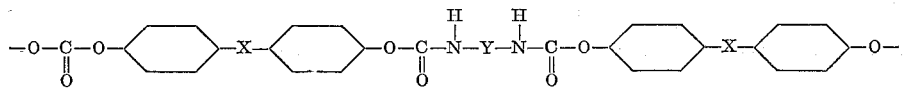

where X is the linking radical between a pair of phenyl radicals of a bis-phenol and Y is a linking radical between the nitrogens of a diamine.

3. A mixed carbonate-carbamate polyester of (A) a bis-phenol, (B) an aliphatic dihydric alcohol, (C) carbonic acid, and (D) a diamine, having at least two carbonate groups per carbamate group.
4. A mixed carbonate-carbamate polyester of (A) a dihydroxy aromatic compound having a pair of phenolic hydroxyls, (B) carbonic acid, and (C) a diamine, the ratio of carbonic groups to carbamate groups being at least 2 to 1.
5. A polycarbonate-carbamate of (A) an alkylidene bis-phenol, (B) carbonic acid, and (C) a diamine, the ratio of carbonic groups to carbamate groups thereof being at least 2 to 1.
6. The product of claim 5 wherein the alkylidene bis-phenol is p,p'-isopropylidene-diphenol.

7. The product of claim 5 wherein the diamine is a condensation product of an aldehyde and aniline.
8. The method of preparing a resinous product which comprises heating together a diisocyanate and a carbamate-carbonate polyester of (A) a bis-phenol, (B) carbonic acid, and (C) a diamine, wherein the ratio of carbonic acid groups to carbamic groups is at least 2 to 1.
9. A method of preparing a resin which comprises reacting a bis-phenol with phosgene in the presence of an hydrogen chloride acceptor until a polycarbonate containing chloroformate has been produced, and reacting said polycarbonate with a diamine.
10. The method of claim 9 wherein the diamine is a condensation product of an aldehyde and aniline.
11. A method of preparing a resin which comprises contacting under reactive conditions a bis-chloroformate of an aliphatic dihydroxy compound, which contains a pair of alcoholic —OH groups, with a mixture of at least two equivalents of a bis-phenol per equivalent of a diamine.
12. The process of claim 11 wherein the bis-chloroformate is diethylene glycol bis-chloroformate.
13. A method of preparing a resinous product which comprises heating together a diisocyanate and a carbamate-carbonate polyester of (A) a bis-phenol, (B) carbonic acid, and (C) a diamine.
14. A reaction product of a diisocyanate and a mixed carbonate-carbamate polyester of (A) a bis-phenol, (B) carbonic acid, and (C) a diamine.
15. The product of claim 1 wherein said diamine is piperazine.
16. The polycarbonate-carbamate of claim 5 wherein said diamine is piperazine.
17. The method of claim 9 wherein the diamine is piperazine.
18. A thermoplastic polycarbonate-polycarbamate polyester comprising repeating units of the formula:

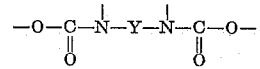

and

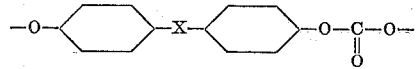

wherein Y is the linking radical between the nitrogens of a diamine and X is the linking radical between a pair of phenyl radicals of a bis-phenol.

19. A thermoplastic polycarbonate-polycarbamate polyester comprising repeating units of the formula:

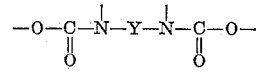

and

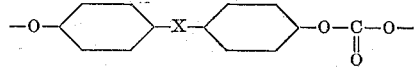

wherein Y is a divalent hydrocarbon radical and X is the linking radical between a pair of phenyl radicals of a bis-phenol.

20. The product of claim 18 wherein the polyester contains at least two

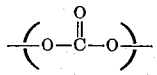

groups per

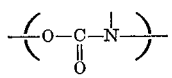

group.

21. The reaction product of a diisocyanate and the polycarbonate-polycarbamate of claim 18.

22. A thermoplastic polycarbonate-polycarbamate polymer comprising repeating units of the formula:

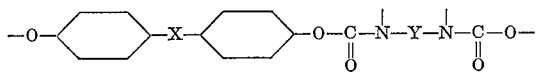

and

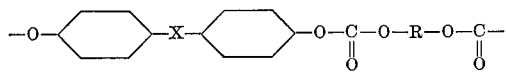

wherein Y is the linking radical between the nitrogens of a diamine, X is the linking radical between a pair of phenyl radicals of a bis-phenol and R is the radical of a dihydroxy compound.

23. A thermoplastic substantially linear mixed carbonate-carbamate polyester of (A) a bis-phenol, (B) carbonic acid, and (C) a diamine.

References Cited by the Examiner
UNITED STATES PATENTS

| 2,631,168 | 3/53 | Ross et al. | 260—77.5 |
| 2,660,574 | 11/53 | Jones et al. | 260—77.5 |
| 2,799,694 | 7/57 | Ross et al. | 260—77.5 |

FOREIGN PATENTS

| 532,543 | 10/54 | Belgium. |
| 546,375 | 3/56 | Belgium. |

OTHER REFERENCES

Ser. No. 341,307, Schlack (A.P.C.), published Apr. 20, 1943.

WILLIAM H. SHORT, *Primary Examiner.*

HAROLD N. BURSTEIN, PHILIP E. MANGAN, *Examiners.*